US011715991B2

United States Patent
Shiraki et al.

(10) Patent No.: US 11,715,991 B2
(45) Date of Patent: Aug. 1, 2023

(54) BRUSHLESS MOTOR

(71) Applicant: MABUCHI MOTOR CO., LTD., Chiba (JP)

(72) Inventors: Kenji Shiraki, Chiba (JP); Katsuhito Nishizawa, Chiba (JP); Shou Kubota, Chiba (JP); Takuya Takahashi, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 47 days.

(21) Appl. No.: 17/458,542

(22) Filed: Aug. 27, 2021

(65) Prior Publication Data

US 2022/0069666 A1    Mar. 3, 2022

(30) Foreign Application Priority Data

Aug. 31, 2020    (JP) .................................. 2020-146430

(51) Int. Cl.
*H02K 3/52* (2006.01)
*H02K 5/22* (2006.01)
*H02K 29/08* (2006.01)

(52) U.S. Cl.
CPC ............... *H02K 5/225* (2013.01); *H02K 3/52* (2013.01); *H02K 3/522* (2013.01); *H02K 29/08* (2013.01); *H02K 2203/03* (2013.01); *H02K 2203/09* (2013.01)

(58) Field of Classification Search
CPC ........ H02K 3/522; H02K 5/225; H02K 29/08; H02K 2203/03; H02K 2211/03; H02K 2203/09; H02K 1/2733; H02K 3/52; H02K 3/50; H02K 5/22; H02K 11/33; H02K 11/30; H02K 3/38; H02K 3/28; H02K 11/21; H02K 11/215
USPC ........................................ 310/71, 68 R, 68 B
See application file for complete search history.

(56) References Cited

U.S. PATENT DOCUMENTS

| 5,770,902 A * | 6/1998 | Batten .................... H02K 5/225 |
| | | 310/68 E |
| 7,990,001 B2 * | 8/2011 | Hatano .................. H05K 3/308 |
| | | 310/71 |
| 10,411,553 B2 * | 9/2019 | Haga ....................... H02K 3/28 |

(Continued)

FOREIGN PATENT DOCUMENTS

JP    2009219335 A    9/2009

*Primary Examiner* — Alexander A Singh
(74) *Attorney, Agent, or Firm* — Hauptman Ham, LLP

(57) ABSTRACT

To provide a brushless motor with a simple configuration, which has accomplished size reduction.
An inner rotor brushless motor having a rotor in a center of a cylindrical stator includes: three bus bars on one end side of the stator in an axial direction thereof, the bus bars connecting three phase coils provided to the stator on a phase-by-phase basis; a bottomed tubular connector portion adjacent to a housing that houses the stator and the rotor; a plurality of connector terminals fixed, penetrating a bottom portion of the connector portion, the plurality of connector terminals being exposed to an internal space of the connector portion; and a board stretching from the one end side of the stator in the axial direction to the bottom portion side of the connector portion, the board being configured to electrically connect an end of each of the bus bars and the penetrating connector terminal.

5 Claims, 8 Drawing Sheets

(56) References Cited

U.S. PATENT DOCUMENTS

2011/0006625 A1     1/2011   Fujii et al.
2016/0261162 A1*   9/2016   Yoshida ................ H02K 5/148

* cited by examiner

BRUSHLESS MOTOR

RELATED APPLICATIONS

The present application claims priority to Japanese Application No. 2020-146430 filed Aug. 31, 2020, the disclosure of which is hereby incorporated by reference herein in its entirety.

BACKGROUND

1. Technical Field

The embodiments disclosed herein relate to an inner rotor brushless motor.

2. Description of the Related Art

In a brushless motor, a conductive member such as a lead wire or bus bar is connected to each of three phase (U phase, V phase, and W phase) coils provided to a stator, and electric current of the corresponding phase is supplied to each coil through the conductive member. For example, JP-A-2009-219335 discloses a brushless motor provided with a bus bar unit including three coil connecting bus bars. The bus bar unit is configured, including a bus bar holder having a connector portion provided radially outward of a main body portion that covers a lower side of a stator core, in addition to the plurality of bus bars. The connector portion is provided with terminal portions of the bus bars. In this manner, in the motor of JP-A-2009-219335, the connector portion is wired only by the bus bars.

It is necessary for a brushless motor to wire a plurality of sensor lines in addition to three phase power lines (output lines). Hence, when a small motor such as a small-diameter brushless motor is fabricated, size reduction is difficult in a configuration where wiring is performed only by bus bars as in JP-A-2009-219335 described above, and the wiring configuration has room for improvement.

The embodiments have been devised considering such a problem, and one object thereof is to provide a brushless motor with a simple configuration, which has accomplished size reduction. The object is not limited to this. Another object of the embodiments is to exert operation and effects derived from configurations illustrated in description of the embodiments described below, which cannot be obtained by the known technology.

SUMMARY (1) A brushless motor disclosed herein is an inner rotor brushless motor having a rotor in a center of a cylindrical stator, the brushless motor including: three bus bars on one end side of the stator in an axial direction thereof, the bus bars connecting three phase coils provided to the stator on a phase-by-phase basis; a bottomed tubular connector portion adjacent to a housing that houses the stator and the rotor; a plurality of connector terminals fixed, penetrating a bottom portion of the connector portion, the plurality of connector terminals being exposed to an internal space of the connector portion; and a board stretching from the one end side of the stator in the axial direction to the bottom portion side of the connector portion, the board being configured to electrically connect an end of each of the bus bars and the penetrating connector terminal.

(2) Preferably, the brushless motor further includes a small case having the connector portion, a tubular portion on the one end side of the stator in the axial direction, and a coupling portion connecting the connector portion and the tubular portion, as an integral whole. In this case, preferably, each of the bus bars has an arc shape as viewed in the axial direction of the stator, and the board has a flush flat plate shape, and has a ring portion superimposed on the bus bars as viewed in the axial direction, the ring portion being housed in the tubular portion.

(3) Preferably, the brushless motor further includes an insulating cover mounted on the small case housing the board from the one end side in the axial direction. In this case, preferably, the cover has a hole portion through which a shaft that rotates together with the rotor in an integrated manner is inserted, each of the tubular portion and the ring portion has a circular hole portion in a center thereof, and all of diameters of the hole portions of the cover, the tubular portion, and the ring portion are greater than an outside diameter of the rotor.

(4) Preferably, the cover has a rib protruding in the axial direction from an edge of an annular portion located around the hole portion, and the rib is crushed upon the cover being pressed against and attached to the small case.

(5) Preferably, each of the connector terminals is fixed by caulking to a fixing hole penetrating the bottom portion of the connector portion.

(6) Preferably, the brushless motor further includes a Hall sensor standing toward the other end side of the stator in the axial direction on the board, the Hall sensor being configured to detect the rotational position of the rotor. In this case, preferably, the Hall sensor is placed radially outward of the rotor, facing the rotor.

According to the brushless motor of the disclosure, size reduction can be accomplished with a simple configuration.

DESCRIPTION OF THE EMBODIMENTS

Figure 1:
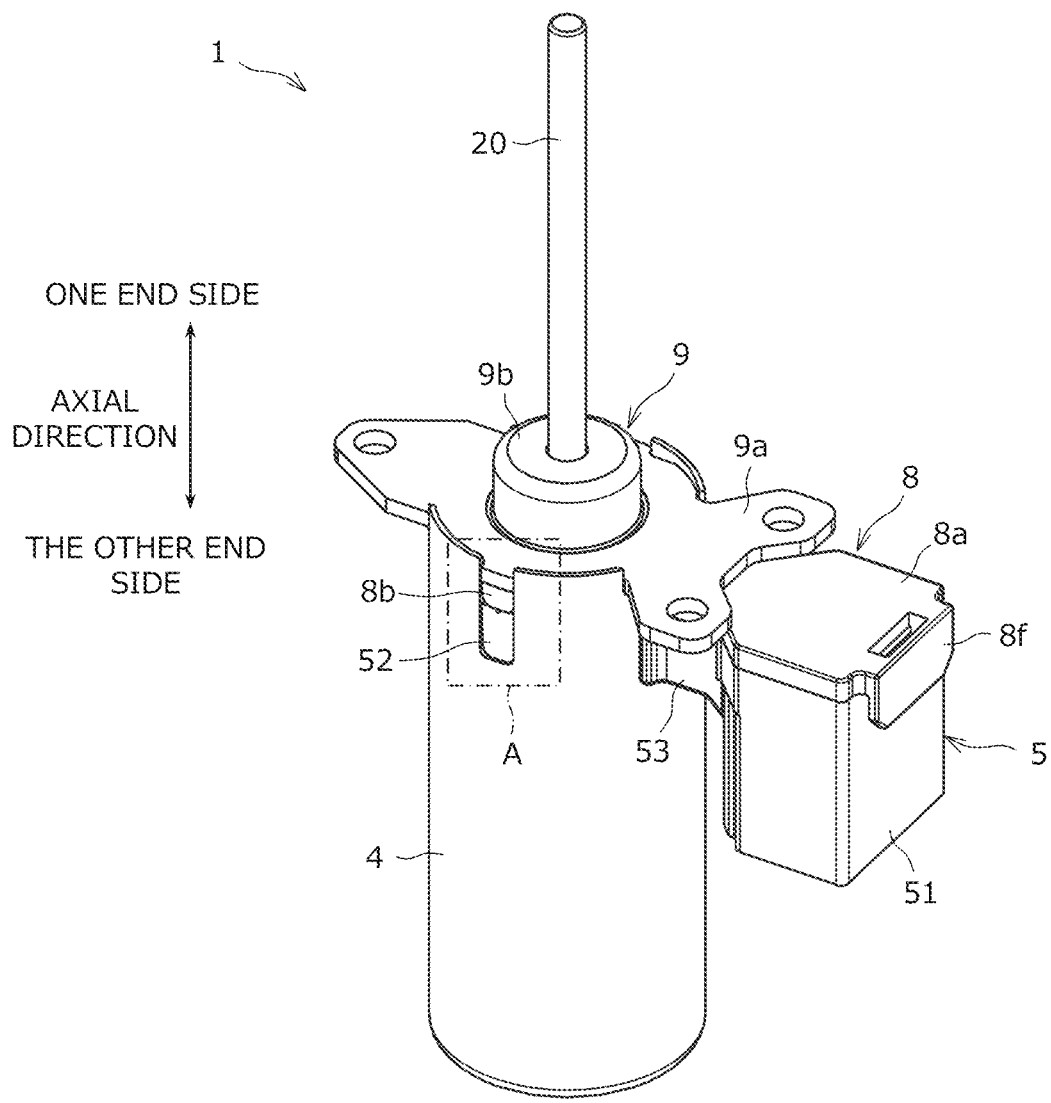
FIG. 1 is a perspective view illustrating a brushless motor according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A brushless motor as an embodiment is described with reference to the drawings. The embodiment illustrated below is a mere exemplification, and does not aim at excluding various modifications and technology applications, which are not explicitly specified in the following embodiment. Configurations of the embodiment can be modified in various manners and implemented within the scope that does not depart from the gist of the configurations. Moreover, the configurations can be selected for use if necessary, or can be combined as appropriate.

1. Configuration

Figure 2:
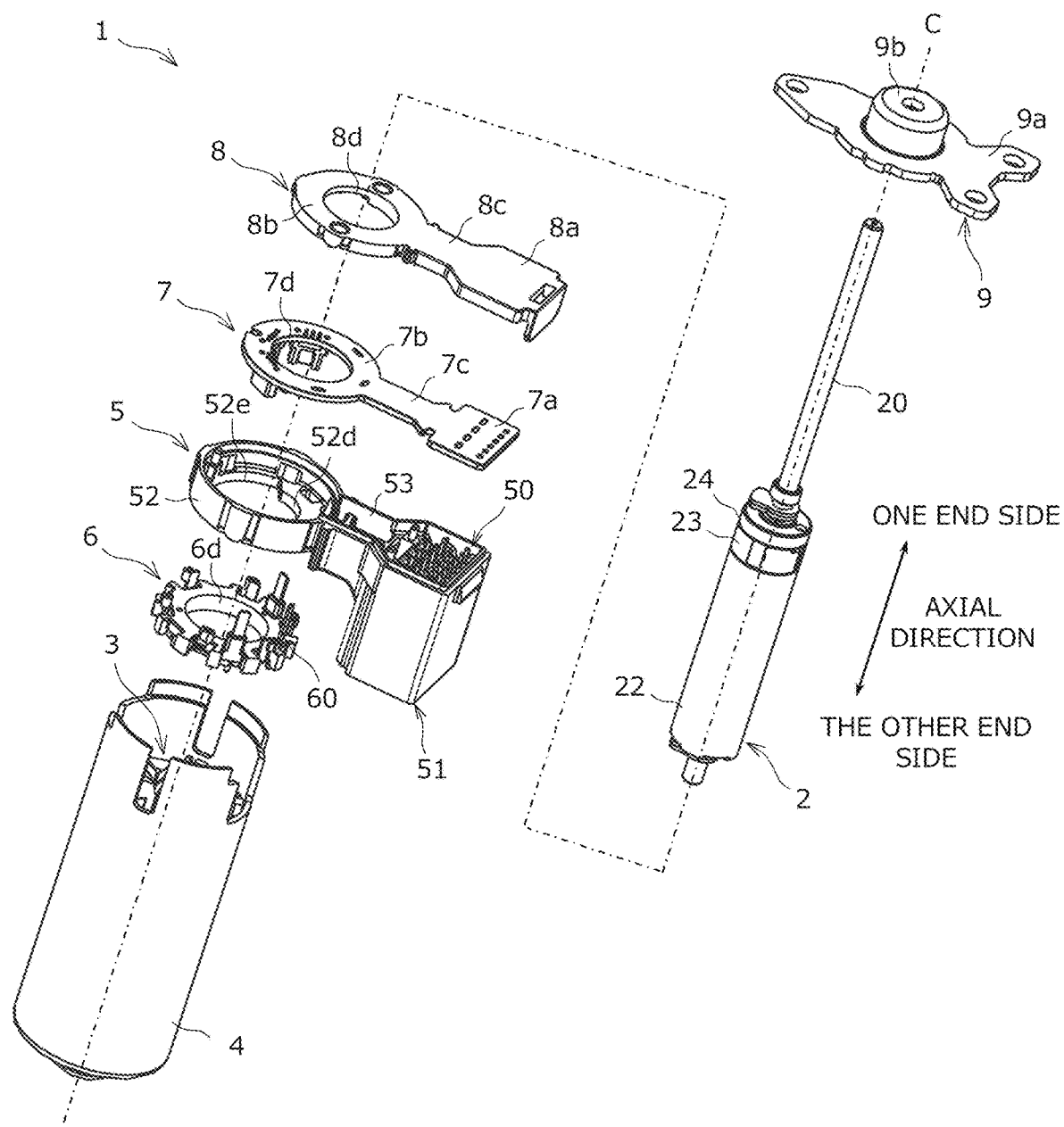
FIG. 2 is an exploded perspective view of the brushless motor of FIG. 1.
Figure 3:
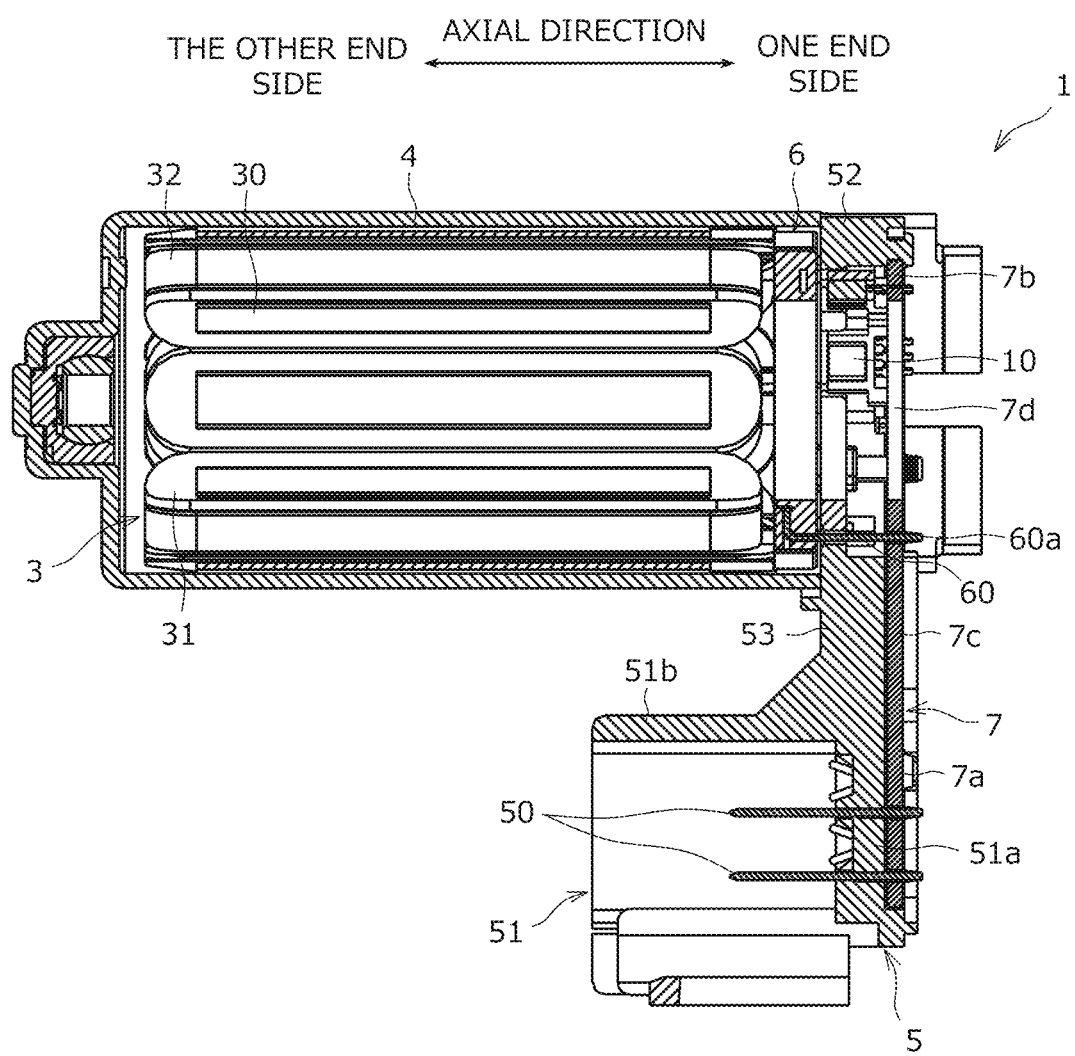
FIG. 3 is a cross-sectional view taken along an axial direction of the brushless motor of FIG. 1, and illustrates the brushless motor, omitting a rotor, a shaft, a small case plate, and a cover.

FIG. 1 is a perspective view of a brushless motor 1 (hereinafter referred to as "motor 1") according to the embodiment. FIG. 2 is an exploded perspective view of the motor 1. FIG. 3 is a cross-sectional view taken along an axial direction of the motor 1, and illustrates the motor 1, omitting a rotor 2, a shaft 20, a small case plate 9, and a cover 8, which are described below. FIGS. 4 to 7 are enlarged perspective views of a small case 5, a bus bar unit 6, a board 7, and the cover 8, which are illustrated in FIG. 2. FIG. 8 is an enlarged view of part A of FIG. 1.

As illustrated in FIGS. 1 to 3, the motor 1 is an inner rotor brushless motor where the rotor 2 is placed in the center of a cylindrical stator 3. In the embodiment, the small-diameter motor 1 with a diameter of 30 mm (φ30) and with six slots is exemplified. The motor 1 includes the columnar rotor 2 having a magnet 22, the stator 3 having coils 32, and the shaft 20 that rotates together with the rotor 2 in an integrated manner. The motor 1 is configured in such a manner as to house the rotor 2 and the stator 3 in a metal housing 4 that forms an outer hull of the motor 1. The housing 4 has a bottomed tubular shape that is open on one end side in the axial direction. The small case plate 9 is fixed to the opening on the one end, and the shaft 20 is provided in such a manner as to protrude from the opening. The external shape of the housing 4 of the embodiment is, but not limited to, cylindrical.

As illustrated in FIG. 2, the rotor 2 includes a rotor core 21 (illustration omitted) that rotates together with the shaft 20 in an integrated manner, the cylindrical magnet 22 fixed to an outer peripheral surface of the rotor core, a bush 23 fixed to the shaft 20 on one end side of the magnet 22, and a sensor magnet 24 that is fixed to the bush 23 and rotates together with the shaft 20 in an integrated manner. The shaft 20 is a rotary shaft that supports the rotor 2, and also functions as an output shaft that takes the output (mechanical energy) of the motor 1 out. The shaft 20 of the embodiment is rotatably supported by a bottom portion of the housing 4 and the small case plate 9 via bearings provided in two locations across the rotor core 21.

As illustrated in FIG. 3, the stator 3 is a substantially cylindrical component having a space where the rotor 2 is placed on an inside diameter side, and includes an annular stator core 30 fixed in the housing 4, and the coils 32 wound around the stator core 30 via insulators 31. The motor 1 of the embodiment is provided with six coils 32. A U-phase current is supplied to two coils 32. A V-phase current is supplied to another two coils 32. A W-phase current is supplied to the remaining two coils 32. In the motor 1, bus bars 60 and the printed board 7 (hereinafter referred to as "board 7") are used to supply the currents.

As illustrated in FIGS. 1 to 3, the motor 1 includes a bottomed tubular connector portion 51 placed adjacent to the housing 4, a plurality of connector terminals 50, the board 7, and the bus bar unit 6 having the bus bars 60. The connector portion 51 of the embodiment has a substantially square tubular outer shape, and is provided in such a manner that the longitudinal direction (central axis direction) is parallel to a central axis C of the motor 1. However, as illustrated in FIG. 3, a bottom portion 51a of the connector portion 51 is located on a side opposite to the bottom portion of the housing 4 (on the one end side). In other words, the housing 4 is open toward the one end side, and the connector portion 51 is open toward the other end side.

The motor 1 of the embodiment includes the small case 5 having the connector portion 51, the cover 8 that is attached to the small case 5, and a Hall sensor 10 that detects the rotational position of the rotor 2. As illustrated in FIGS. 1 to 3, in the motor 1 of the embodiment, the small case 5 having the connector portion 51 is attached to the housing 4 to place the connector portion 51 adjacent to the housing 4.

The small case 5 is a component formed of insulating material (such as resin), and includes the above connector portion 51, a tubular portion 52 placed on the one end side of the stator 3 in the axial direction, and a coupling portion 53 that connects the connector portion 51 and the tubular portion 52, as an integral whole. The tubular portion 52 has a bottomed cylindrical outer shape. The tubular portion 52 is housed near the opening of the housing 4 on the one end side in an attitude of orienting a bottom portion of the tubular portion 52 toward the stator 3. The bus bar unit 6 is placed between the tubular portion 52 and the stator 3 in the axial direction.

Figure 4:
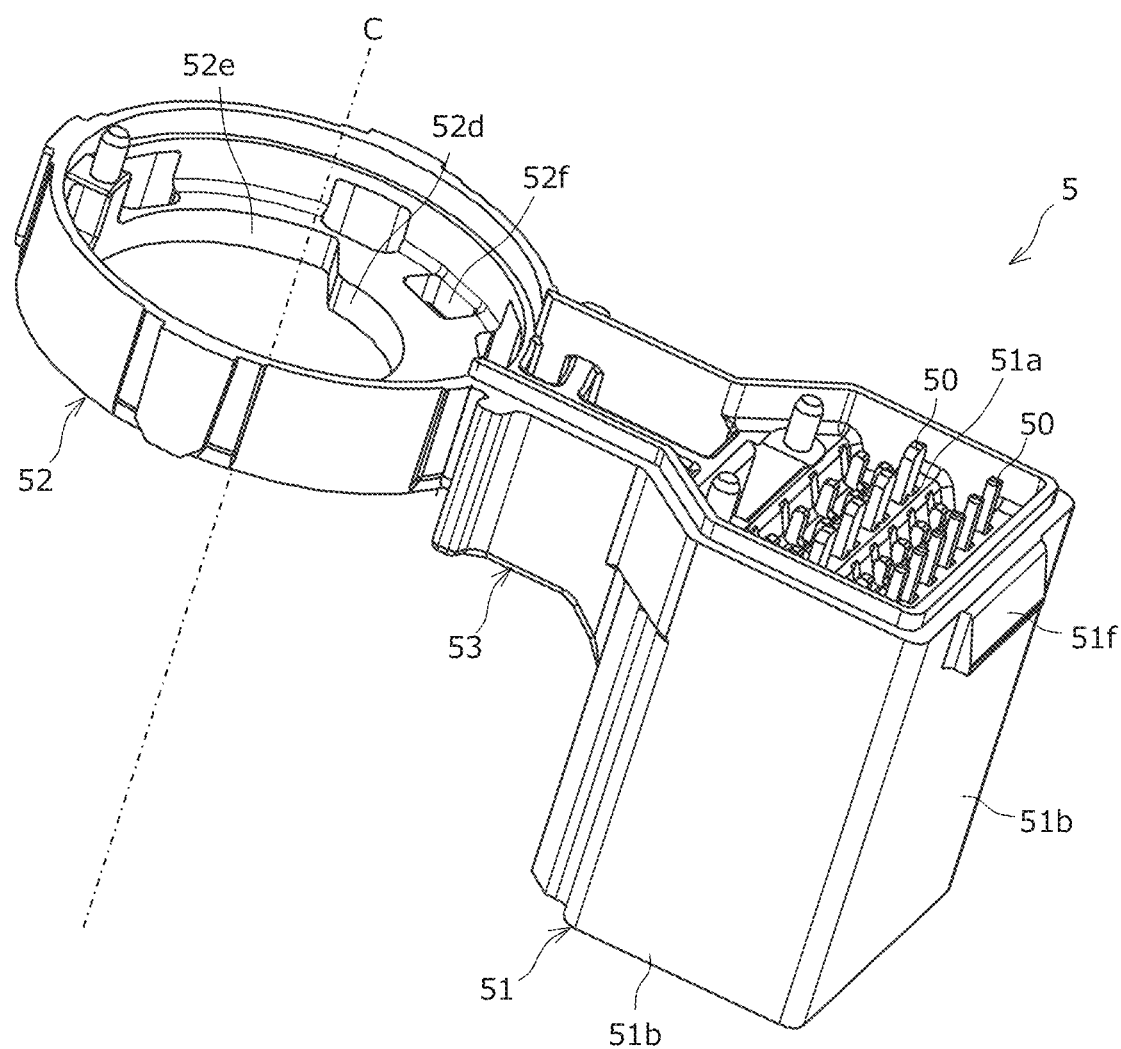
FIG. 4 is a perspective view illustrating a small case of FIG. 2.

As illustrated in FIGS. 3 and 4, the plurality of connector terminals 50 penetrates the bottom portion 51a of the connector portion 51, and is fixed to the bottom portion 51a. The connector terminal 50 is placed, exposed, in an internal space surrounded by four side surface portions 51b of the connector portion 51. The connector terminals 50 include a terminal for power supply and a terminal for an operation signal, and enable input of power and an operation signal from the outside. In the embodiment, each connector terminal 50 is fixed by caulking to a fixing hole provided to the bottom portion 51a of the connector portion 51 in such a manner as to penetrate the bottom portion 51a. Consequently, the plurality of connecter terminals 50 can be easily fixed to the connector portion 51 with the connector terminals 50 in close proximity to each other. As illustrated in FIG. 4, the connector portion 51 includes a protruding portion 51f that is provided in such a manner as to protrude from one of the four side surface portions 51b, which is farthest from the tubular portion 52. The protruding portion 51f is a portion for latching the cover 8, and is located on the bottom portion 51a side.

The tubular portion 52 includes a circular hole portion 52d that is provided in the center of the bottom portion in such a manner as to penetrate the bottom portion. The hole portion 52d is concentric with the central axis C of the motor 1. In the embodiment, a part of the hole portion 52d in a circumferential direction thereof is cut toward the outer side in the radial direction, and expanded. The Hall sensor 10 is placed in an expanded notch portion 52e. Moreover, output pin holes 52f through which an end portion 60b of the bus bar 60 described below is inserted are provided in the bottom portion of the tubular portion 52 in such a manner as to penetrate the bottom portion. The coupling portion 53 is a substantially square U-shaped portion in cross section, which is provided, extending radially outward from the tubular portion 52, and connected to the connector portion 51. A part of a side surface portion of the tubular portion 52 is cut out in a place of the coupling portion 53. A space surrounded by the side surface portion of the tubular portion 52 communicates with a space surrounded by the square U shape of the coupling portion 53. The board 7 is placed in these spaces.

Figure 5:
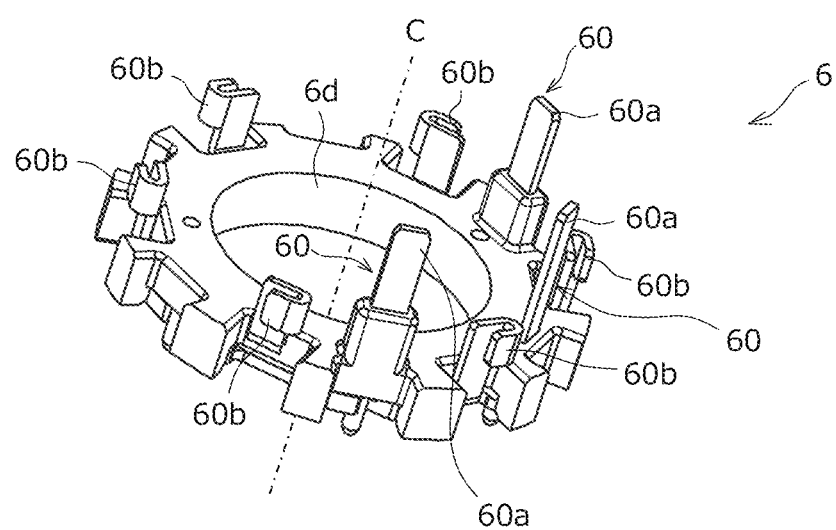
FIG. 5 is a perspective view illustrating a bus bar unit of FIG. 2.

As illustrated in FIGS. 2, 3, and 5, the bus bar unit 6 is an annular component placed on the one end side of the stator 3 in the axial direction, and includes three bus bars 60. The bus bar 60 is a conductive flat plate member that connects three phase coils 32 provided to the stator 3 on a phase-by-phase basis. The bus bars 60 have an arc shape as viewed in the axial direction of the stator 3. The arc portion (illustration omitted) is a portion that extends in a direction orthogonal to the axial direction, and connects the coils 32 of the same phase. The bus bars 60 include end portions 60a and 60b that are formed in such a manner as to bend from the arc portions toward the one end side in the axial direction. Three end portions 60a are output pins (pin portions for power supply), and six end portions 60b are terminals for connecting the wound coils 32. The bus bar unit 6 of the embodiment is provided as an insert molded product obtained by molding the bus bars 60 with resin. The bus bar unit 6 includes, in a center thereof, a circular hole portion 6d concentric with the central axis C of the motor 1.

Figure 6:
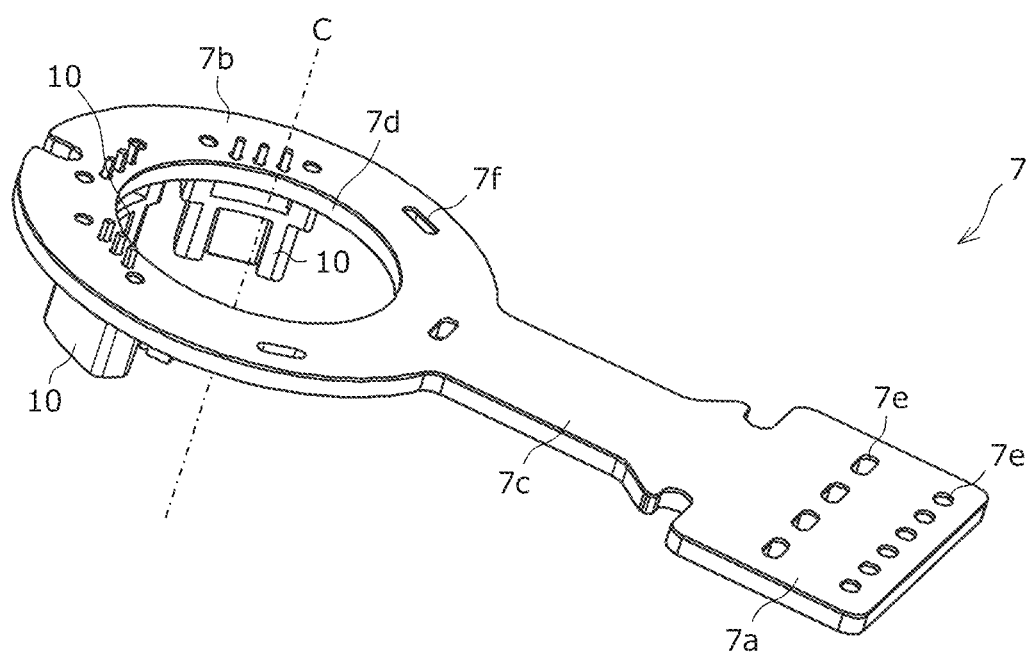
FIG. 6 is a perspective view illustrating a board of FIG. 2.

As illustrated in FIGS. 2, 3, and 6, the board 7 is a component that electrically connects the end portions 60a and 60b of the bus bars 60 to the connector terminals 50 penetrating the bottom portion 51a. The board 7 is placed, stretching from the one end side of the stator 3 in the axial direction to the bottom portion 51a side of the connector portion 51. A pattern including a sensor line for taking a Hall signal out, a power line, and a ground line, in addition to output lines of U, V, and W phases, is placed on the board 7. The board 7 of the embodiment has a flush flat plate shape, and is placed on the one end side of the small case 5.

The board 7 of the embodiment includes a substantially rectangular terminal connection portion 7a to which the connector terminals 50 are connected, a doughnut-shaped ring portion 7b superimposed on the bus bars 60, and a connection portion 7c in a straight line that connects the terminal connection portion 7a and the ring portion 7b, as viewed in the axial direction. The terminal connection portion 7a is housed in the connector portion 51. The ring portion 7b is housed in the tubular portion 52. The connection portion 7c is housed in the coupling portion 53. Terminal holes 7e where the connector terminals 50 are inserted and fixed are provided in the terminal connection portion 7a in such a manner as to penetrate the terminal connection portion 7a. The ring portion 7b includes, in a center thereof, a circular hole portion 7d concentric with the central axis C of the motor 1. Furthermore, output pin holes 7f where the end portions 60b of the bus bars 60 are inserted and fixed are provided in the ring portion 7b in such a manner as to penetrate the ring portion 7b.

The Hall sensor 10 is provided on the ring portion 7b of the board 7 in such a manner as to stand toward the other end side of the stator 3 in the axial direction, and placed radially outward of the rotor 2, facing the sensor magnet 24. Consequently, the Hall sensor 10 detects the rotation of the sensor magnet 24 that rotates together with the shaft 20 in an integrated manner.

Figure 7:
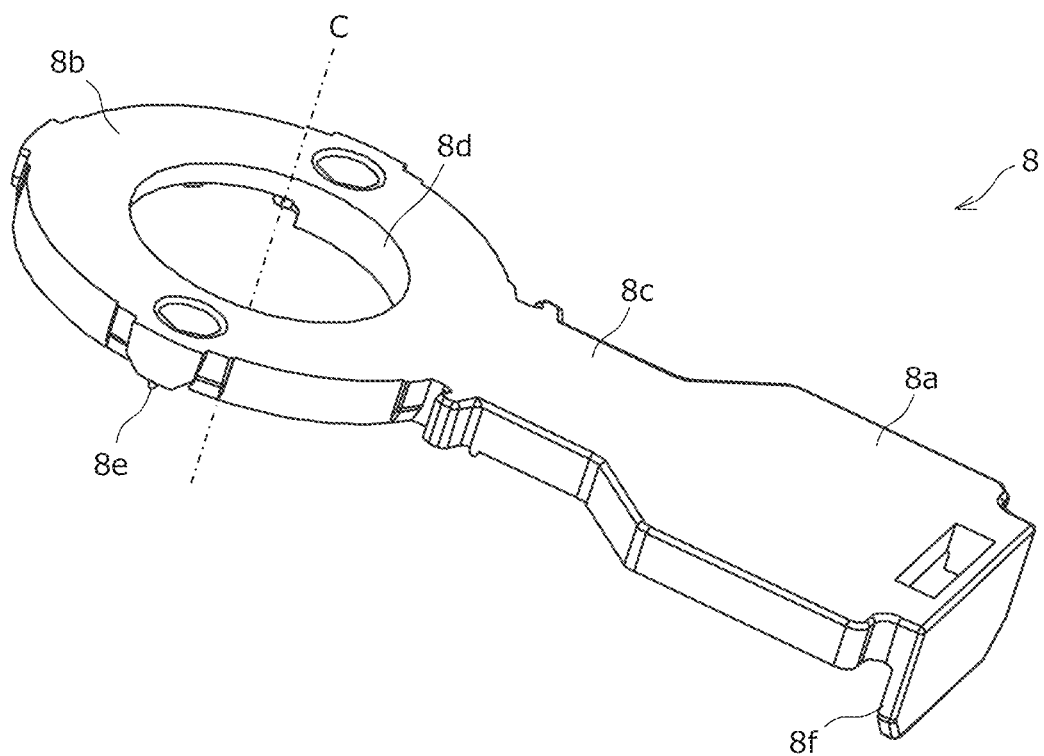
FIG. 7 is a perspective view illustrating the cover of FIG. 2.
Figure 8:
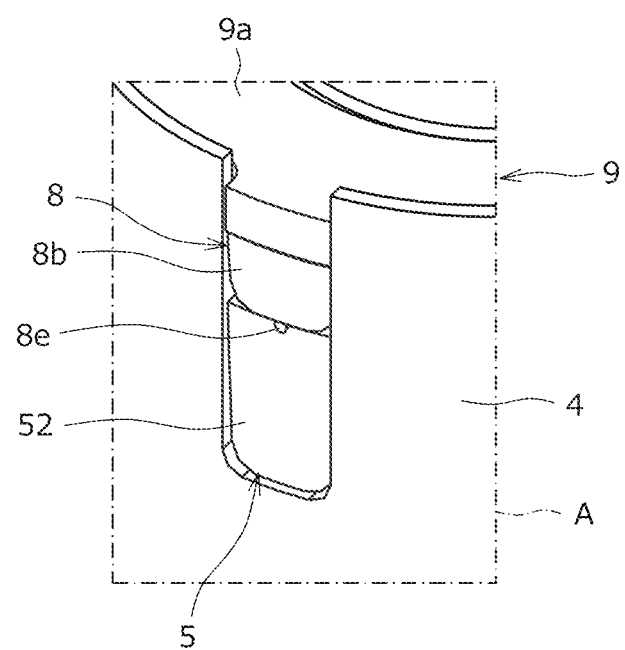
FIG. 8 is an enlarged view of part A of FIG. 1.

As illustrated in FIGS. 1, 2, and 7, the cover 8 is an insulating component that is attached to the small case 5 across the board 7 from the one end side in the axial direction, and covers the opening of the small case 5. The cover 8 has substantially the same shape as the outer shape (outer edge portion) of the small case 5 on the one end side as viewed in the axial direction. In other words, the cover 8 includes a connector cover portion 8a that covers the connector portion 51, an annular portion 8b that covers the tubular portion 52, and a connection portion 8c that covers the coupling portion 53. The annular portion 8b includes a hole portion 8d that is formed into a circle concentric with the central axis C.

As illustrated in FIG. 2, in the motor 1 of the embodiment, the bus bar unit 6, the small case 5, the board 7, and the cover 8 are attached in this order to the stator 3 housed in the housing 4. All of the hole portion 6d of the bus bar unit 6, the hole portion 52d of the small case 5, the hole portion 7d of the board 7, and the hole portion 8d of the cover 8 coincide with each other. The shaft 20 is inserted through the hole portions 6d, 52d, 7d and 8d. In the motor 1 of the embodiment, all of the diameters of the hole portions 6d, 52d, 7d, and 8d are greater than the outside diameter of the rotor 2. Consequently, it is possible to insert the rotor 2 integrated with the shaft 20 into the housing 4 (the stator 3) after four elements 6, 5, 7, and 8 are assembled to the housing 4.

As illustrated in FIG. 7, the cover 8 of the embodiment includes a latch portion 8f that latches the cover 8 onto the connector portion 51, and a rib 8e for preventing the cover 8 from being displaced relative to the small case 5. The latch portion 8f engages with the protruding portion 51f that is provided to the side surface portion 51b of the connector portion 51 in such a manner as to protrude from the side surface portion 51b. The rib 8e is provided to an edge of the annular portion 8b located around the hole portion 8d in such a manner as to protrude toward the other end side in the axial direction. As illustrated in FIG. 8, the rib 8e is crushed when the cover 8 is pressed against the small case 5, and attached thereto. FIG. 8 illustrates a state before the rib 8e is crushed (deformed). The position of the cover 8 is fixed only by pressing and crushing the rib 8e in this state.

As illustrated in FIGS. 1 and 2, the small case plate 9 is a metal component that is mounted on the one end side of the cover 8, and is fixed to the housing 4. The small case plate 9 of the embodiment includes a flat portion 9a that is mounted on a surface on the one end side of the cover 8, and a bulging portion 9b that is formed into a bottomed tubular shape on the flat portion 9a with the central axis C as the center. The bulging portion 9b is a portion that houses an unillustrated bearing.

2. Effects (1) According to the above-mentioned motor 1, the U, V, and W phases are connected by the bus bars 60, and the end portions 60a and 60b of the bus bars 60 are wired to the connector terminals 50 by use of the board 7. Accordingly, a reduction in the size of the motor 1 can be realized with a simpler configuration than a configuration where wiring is performed only by a known bus bar unit.

(2) In the above-mentioned motor 1, the connector portion 51 is provided as a part of the small case 5. The tubular portion 52 of the small case 5 is placed on the one end side of the stator 3 in the axial direction. Accordingly, the connector portion 51 can be placed adjacent to the housing 4. Furthermore, the board 7 has a flush flat plate shape, and is superimposed on the arc-shaped bus bars 60 as viewed in the axial direction. Hence, the thickness of a portion (a non-magnetic circuit portion) other than the coils 32 of the stator 3 can be reduced to the minimum, which also enables a reduction in the size of the motor 1.

(3) In the above-mentioned motor 1, all of the diameters of the hole portion 52d of the tubular portion 52 of the small case 5, the hole portion 7d of the ring portion 7b of the board 7, and the hole portion 8d of the cover 8 are greater than the outside diameter of the rotor 2. Accordingly, the rotor 2 can be incorporated after these three elements are assembled to the housing 4. Hence, it is possible to prevent damage to the rotor 2, and reduce equipment constraints during assembly. Therefore, it is possible to improve assemblability and reduce the manufacturing cost.

(4) According to the above-mentioned motor 1, the rib 8e is provided to the annular portion 8b of the cover 8 in such a manner as to protrude from the annular portion 8b. The crushing of the rib 8e enables preventing the axial play of the cover 8 relative to the small case 5.

(5) According to the above-mentioned motor 1, each connector terminal 50 is fixed by caulking to the fixing hole that is provided in the bottom portion 51a of the connector portion 51 in such a manner as to penetrate the bottom portion 51a. Accordingly, the plurality of connector terminals 50 can be fixed more easily to the connector portion 51 in close proximity to each other than a configuration where the connector terminals 50 are fixed by, for example, welding or bonding.

(6) According to the above-mentioned motor 1, the Hall sensor 10 is provided on the board 7 in such a manner as to stand toward the other end side of the stator 3 in the axial direction, and detects the rotational position of the rotor 2 from the side of the rotor 2. Accordingly, it is possible to reduce the dimension of the motor 1 in the axial direction, and further reduce the size of the motor 1.

3. Others

The configuration of the motor 1 described in the above-mentioned embodiment is an example, and is not limited to the above-mentioned configuration. For example, the connector portion 51 may be open toward the one end side in the axial direction, or may be open in the radial direction. It is simply required to at least place the connector portion 51 adjacent to the housing 4 and fix the plurality of connector terminals 50. The method for fixing the plurality of connector terminals 50 is not limited to caulking. Another fixing method such as bonding may be employed.

The shape and attachment method of the cover 8 may not be those described above. For example, the rib 8e of the cover 8 may be omitted, or the cover 8 may be mounted on the small case 5 by screwing or pinning instead of the latch portion 8f. Moreover, the shape and material of the small case plate 9 are not limited to those described above either. In the above motor 1, the configuration where the rotor 2 is inserted after the bus bar unit 6, the small case 5, the board 7, and the cover 8 are attached to the housing 4 is exemplified. However, the rotor 2 may be inserted first, and then the elements may be assembled. In this case, the diameters of the hole portions 6d, 52d, 7d, and 8d may be less than the outside diameter of the rotor 2.

The attachment position and orientation of the Hall sensor 10 are not limited to those described above. For example, the Hall sensor 10 may be attached to the board 7 in such a manner as to detect rotation from the axial direction of the rotor 2. The Hall sensor 10 itself may be omitted. Moreover, the bus bars 60 may not be molded with resin. The board 7 may not have a flush flat plate shape. The size of and the number of poles of the motor 1 are examples. The motor 1 may be, for example, a motor of a small diameter such as $\phi 24$ or $\phi 36$. The wiring structure using the board can also be applied to a motor other than a small-diameter motor.

What is claimed is:

1. An inner rotor brushless motor including a rotor in a center of a cylindrical stator, the inner rotor brushless motor comprising:
   three bus bars on one end side of the cylindrical stator in an axial direction thereof, the bus bars connecting three phase coils provided to the cylindrical stator on a phase-by-phase basis;
   a bottomed tubular connector portion adjacent to a housing that houses the cylindrical stator and the rotor;
   a plurality of connector terminals fixed, penetrating a bottom portion of the bottomed tubular connector portion, the plurality of connector terminals being exposed to an internal space of the bottomed tubular connector portion; and
   a board stretching from the one end side of the cylindrical stator in the axial direction to the bottom portion side of the bottomed tubular connector portion, the board being configured to electrically connect an end of each of the bus bars and the connector terminals; and
   a small case including the bottomed tubular connector portion, a tubular portion on the one end side of the cylindrical stator in the axial direction, and a coupling portion connecting the bottomed tubular connector portion and the tubular portion, as an integral whole, wherein
   each of the bus bars has an arc shape as viewed in the axial direction of the cylindrical stator, and
   the board has a flush flat plate shape, and includes a ring portion superimposed on the bus bars as viewed in the axial direction, the ring portion being housed in the tubular portion.

2. The inner rotor brushless motor according to claim 1, further comprising an insulating cover mounted on the small case housing the board from the one end side in the axial direction, wherein
   the insulating cover includes a hole portion through which a shaft that rotates together with the rotor in an integrated manner is inserted,
   each of the tubular portion and the ring portion includes a circular hole portion in a center thereof, and
   all of diameters of the hole portion of the insulating cover, the tubular portion, and the ring portion are greater than an outside diameter of the rotor.

3. The inner rotor brushless motor according to claim 2, wherein
   the insulating cover includes a rib protruding in the axial direction from an edge of an annular portion located around the hole portion, and
   the rib is crushed upon the insulating cover being pressed against and attached to the small case.

4. The inner rotor brushless motor according to claim 1, wherein each of the connector terminals is fixed by caulking to a fixing hole penetrating the bottom portion of the bottomed tubular connector portion.

5. The inner rotor brushless motor according to claim 1, further comprising
   a Hall sensor standing toward an other end side of the cylindrical stator, which is in an opposite direction from the one side, in the axial direction on the board, the Hall sensor being configured to detect the rotational position of the rotor, wherein
   the Hall sensor is placed radially outward of the rotor, facing the rotor.

\* \* \* \* \*